(12) United States Patent
Boekhoorn et al.

(10) Patent No.: US 8,534,503 B2
(45) Date of Patent: Sep. 17, 2013

(54) DEVICE FOR PREPARING DRINKS AND METHOD FOR CLEANING SUCH A DEVICE

(75) Inventors: Marcel Martinus Jacobus Johannes Boekhoorn, Bennekom (NL); Maarten Arns, Wijchen (NL); Harry Schippers, Wierden (NL)

(73) Assignee: Toeca International Company B.V., Breda (NL)

( * ) Notice: Subject to any disclaimer, the term of this patent is extended or adjusted under 35 U.S.C. 154(b) by 312 days.

(21) Appl. No.: 12/866,524

(22) PCT Filed: Feb. 6, 2009

(86) PCT No.: PCT/NL2009/050054
§ 371 (c)(1),
(2), (4) Date: Nov. 15, 2010

(87) PCT Pub. No.: WO2009/099330
PCT Pub. Date: Aug. 13, 2009

(65) Prior Publication Data
US 2011/0049187 A1 Mar. 3, 2011

(30) Foreign Application Priority Data

Feb. 6, 2008 (WO) ................ PCT/NL2008/050068
Aug. 4, 2008 (NL) ..................................... 2001873

(51) Int. Cl.
*B67D 7/06* (2010.01)
(52) U.S. Cl.
USPC ..... 222/148; 222/108; 222/144.5; 222/145.2; 222/145.6; 222/146.6; 141/91; 141/275; 141/281; 141/283; 366/347

(58) Field of Classification Search
USPC ................ 222/108–111, 129.1, 129.3, 129.4, 222/144.5, 145.2, 145.5, 145.6, 145.1, 146.6; 141/89–91, 97, 11, 82, 275–278, 281–283; 366/204, 347; 134/10
See application file for complete search history.

(56) References Cited

U.S. PATENT DOCUMENTS

| | | | | |
|---|---|---|---|---|
| 2,127,615 A | * | 8/1938 | Peters et al. | 141/54 |
| 4,615,466 A | * | 10/1986 | Credle, Jr. | 222/129.1 |
| 6,679,400 B1 | * | 1/2004 | Goodman | 222/108 |
| 6,755,224 B2 | * | 6/2004 | Tawa et al. | 141/144 |
| 6,928,824 B2 | * | 8/2005 | Hess et al. | 62/66 |
| 2006/0186137 A1 | * | 8/2006 | Till | 222/148 |

FOREIGN PATENT DOCUMENTS

| | | |
|---|---|---|
| JP | 10134246 A | 5/1998 |
| WO | 2006090183 A2 | 8/2006 |
| WO | 2008097088 A1 | 8/2008 |

OTHER PUBLICATIONS

Search Report and Written Opinion for International Patent Application No. PCT/NL2009/050054; Sep. 2, 2009.

* cited by examiner

*Primary Examiner* — J. Casimer Jacyna
(74) *Attorney, Agent, or Firm* — Jason A. Bernstein; Barnes & Thornburg LLP

(57) ABSTRACT

A device for preparing drinks, in particular, cooled drinks. Also disclosed is a multi-way coupling for use in a device for cooling drinks and a method for cleaning a device for preparing drinks.

13 Claims, 3 Drawing Sheets

DEVICE FOR PREPARING DRINKS AND METHOD FOR CLEANING SUCH A DEVICE

PRIORITY CLAIM OR CROSS REFERENCE TO RELATED APPLICATIONS

This patent application is a U.S. National Phase of International Patent Application No. PCT/NL2009/050054, filed Feb. 6, 2009, which claims priority to Netherlands Patent Application No. 2001873, filed Aug. 4, 2008, and International Patent Application No. PCT/NL2008/050068, filed Feb. 6, 2008, the disclosures of which are incorporated herein by reference in their entirety.

FIELD

The present disclosure relates to a device for preparing drinks. The present disclosure also relates to a multi-way coupling for use in the device for preparing drinks. The present disclosure further relates to a method for cleaning the device.

BACKGROUND

A device for cooling drinks is described in International Patent Application No.: PCT/NL2008/050068. Using this device, a drink, such as a milkshake, can be cooled quickly and effectively by mixing the drink with a dosed quantity of liquid cryogenic cooling medium, in particular, liquid nitrogen. In order to prevent instant freezing of the drink, a vortex is created in the drink by means of stirring during addition of the cooling medium to the drink. In addition to the method of adding the cryogenic cooling medium to the drink, the periodic cleaning of such a device also represents a critical process. There is a need to optimize this cleaning process, whereby cleaning of the supply conduit can take place in a relatively simple and efficient manner.

SUMMARY

The present disclosure describes several exemplary embodiments of the present invention.

One aspect of the present disclosure provides a device for preparing drinks, comprising (a) at least one drink supply container; (b) at least one dosing element connected to the drink supply container by at least one supply conduit for dosing a quantity of drink; (c) at least one drinking cup holder adapted to releasably hold at least one drinking cup to enable collection of a dosed quantity of drink dispensed by the dosing element, wherein the drinking cup holder has at least one discharge; (d) at least one discharge conduit connected to the discharge of the drinking cup holder; (e) at least one flushing water supply connected to the supply conduit and closable relative to the supply conduit for flushing the supply conduit; and (f) a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element.

Another aspect of the present disclosure provides a multi-way coupling for use in a device for preparing drinks, the device comprising (a) at least one drink supply container; (b) at least one supply conduit for dosing a quantity of drink; (c) at least one dosing element connected to the drink supply container by the at least one supply conduit; (d) at least one drinking cup holder adapted to releasably hold at least one drinking cup to enable collection of a dosed quantity of drink dispensed by the dosing element, wherein said drinking cup holder has at least one discharge; (e) at least one discharge conduit connected to the discharge of the drinking cup holder; (f) at least one flushing water supply connected to the supply conduit and closable relative to the supply conduit for flushing the supply conduit, (g) a first multi-way coupling connecting the flushing water supply to the supply conduit, wherein the first multi-way coupling includes (i) a plurality of coupling conduits for coupling the drink supply containers to the first multi-way coupling, (ii) a plurality of closing valves to enable selective closure of the coupling conduits relative to the supply conduit, (iii) biasing means for urging the closing valves to a position closing the coupling conduits relative to the supply conduit, (iv) an axially rotatable camshaft having a plurality of cams, wherein each cam is adapted to operate at least one closing valve, at least one coupling conduit and at least one closing valve co-acting with the coupling conduit, wherein each closing valve comprises sealing means to enable substantially liquid-tight closure of the coupling conduit relative to the supply conduit, wherein the first multi-way coupling has a modular construction, wherein said first multi-way coupling is adapted for simultaneous coupling to a plurality of drink supply containers; (f) at least one motor for driving the camshaft; and, (g) a closing element for substantially liquid-tight closing of the drinking cup holder, wherein the dosing element is connected to the closing element, and wherein the orientation of the drinking cup holder relative to the closing element can be changed between an opened configuration positioned at a distance from the closing element, and a closed configuration connecting to the closing element.

A further aspect of the present disclosure provides a method for cleaning a device having at least one drink supply container, the device comprising at least one dosing element connected to the drink supply container by at least one supply conduit for dosing a quantity of drink; at least one drinking cup holder adapted to releasably hold at least one drinking cup to enable collection of a dosed quantity of drink dispensed by the dosing element, wherein said drinking cup holder has at least one discharge; at least one discharge conduit connected to the discharge of the drinking cup holder; at least one flushing water supply connected to the supply conduit and closable relative to the supply conduit for flushing the supply conduit; and a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element, the method comprising the steps of (a) flushing the supply conduit with flushing water from the flushing water supply; (b) collecting flushing water flushed through the supply conduit in the drinking cup holder; and (c) discharging collected flushing water from the drinking cup holder.

One aspect of the present disclosure provides a device for preparing drinks which can be cleaned in a relatively simple and efficient manner.

The present disclosure provides a device comprising at least one drink supply container; at least one dosing element which is connected to the drink supply container via at least one supply conduit for the purpose of dosing a quantity of drink; at least one drinking cup holder adapted to releasably hold at least one drinking cup to enable collection of a dosed quantity of drink dispensed by the dosing element, wherein the drinking cup holder is provided with at least one discharge; at least one discharge conduit connected to the discharge of the drinking cup holder; and at least one flushing water supply which is connected to the supply conduit and is closable relative to the supply conduit for the purpose of flushing the supply conduit. By having the flushing water supply connect to the supply conduit for the drink and having the discharge conduit connect to the drinking cup holder, the device according to one aspect of the present disclosure, and, in particular, the supply conduit and the drinking cup holder, can be cleaned in situ in a relatively simple manner. The device according to one aspect of the present disclosure comprises a cleaning circuit, or at least a cleaning system, which forms an integral part of the device as such, whereby the device can be embodied structurally in a relatively simple and, therefore, inexpensive manner. Furthermore, a specialist will generally not be required to clean the device because the cleaning of the device could take place completely autonomously using a control unit which has a favorable effect on operational costs. The flushing water is formed, in a first exemplary embodiment, by drinking water which will be advantageous from a financial viewpoint and a health viewpoint. The flushing water in the device can optionally be enriched with a cleaning agent to enable cleaning of the device, wherein the device can optionally also be disinfected as a particular form of cleaning. For purposes of the present disclosure, the preparation of a drink means the dispensing of a dosed quantity of drink, in particular, a cooled drink. Various drinks can be prepared using the device according to the present disclosure, including milkshakes, alcoholic (mixed) drinks, iced drinks, in particular, slush puppies, fruit drinks, in particular smoothies, soft drinks, yoghurt, quark cheese (a type of fresh cheese typically enjoyed in Europe), soups and water. It is, however, also possible to cool soft ice cream using the device according to the present disclosure. For purposes of the present disclosure, soft ice cream is, therefore, included in the meaning of the term "drink". For a further specification in respect to the cooling of drinks, reference is made to International Patent Application No. PCT/NL2008/050068, the disclosure of which is incorporated herein by reference in its entirety.

In one exemplary embodiment, the dosing element is connected to a closing element to enable substantially liquid-tight closing of the drinking cup holder. The orientation of the drinking cup holder relative to the closing element can preferably be changed between an opened configuration positioned at a distance from the closing element, and a closed configuration connecting to the closing element. In the opened configuration, a drinking cup can be positioned in the drinking cup holder and be removed from the drinking cup holder. In the closed configuration, the flushing water can be injected into the drinking cup holder in a relatively efficient manner without the flushing water contaminated with drink residues and the like splashing out of the drinking cup holder. Having the drinking cup receive a dosed quantity of drink, and possibly a cooling medium and/or an additive, can take place in both the closed configuration and in the opened configuration. If, however, the drinking cup holder is provided with a drinking cup, it is not usually possible to close the drinking cup holder. Therefore, filling of the drinking cup will generally take place in the opened configuration of the drinking cup holder. It is generally advantageous to have the flushing water level in the drinking cup holder increase during the process of cleaning the device in order to enable improved cleaning of the drinking cup holder. More preferably, the drinking cup holder closed by the closing element is substantially completely filled with flushing water in order to enable the best possible cleaning of both the inside of the drinking cup holder and the underside of the closing element. Allowing the flushing water level to increase in the drinking cup holder can be realized in a relatively simple manner by making the speed at which the flushing water is added to the drinking cup holder higher than the speed at which the flushing water is removed from the drinking cup holder. The discharge conduit connected to the drinking cup holder can be provided with a closing valve to enable temporary blocking of the discharge of flushing water from the drinking cup holder, whereby the flushing water level in the drinking cup holder will rise relatively quickly. The closing element is preferably provided with at least one overflow connected to a top side of the drinking cup holder to enable discharge of excess flushing water from the drinking cup holder. Because the flushing water is generally guided under pressure into the drinking cup holder, the flushing water will then also be discharged under pressure via the overflow. The overflow is optionally provided with a non-return valve and the flushing water will generally be drained via the overflow. It is, however, also possible to envisage the overflow being coupled to the discharge conduit connected to an underside of the drinking cup holder in order to allow the flushing water to circulate. The closing element for closing the drinking cup holder is preferably manufactured at least partially from a sealing material, such as, for instance, an elastomer, in order to limit leakages, and thereby the chance of splashing, as far as possible. It is, however, also possible to envisage the drinking cup holder itself being provided with sealing means, such as, for instance, an elastic upper edge, to which the closing element can connect to enable substantially medium-tight, or at least liquid-tight, closure of the drinking cup holder.

In one exemplary embodiment, the device comprises at least one stirring element adapted to be positioned at least partially in a space enclosed by the drinking cup holder. The stirring element will generally be adapted primarily, although not necessarily, to be at least partially received in a drinking cup positioned in the drinking cup holder in order to enable active mixing of a dosed quantity of drink with a dosed quantity of cooling medium and/or additive. It is, however, advantageous if the stirring element is applied for setting into motion flushing water received in the drinking cup holder during cleaning of the device according to the present disclosure. By actively setting and keeping the flushing water in motion, the drinking cup holder can be cleaned intensively and completely. This significantly enhancing the cleaning process. In another exemplary embodiment, the closing element for closing the drinking cup holder is adapted to enclose at least a part of the stirring element. The stirring element will generally be received at least partially in the closing element. This will usually enhance the stability of the stirring element, but will also make it possible to keep the applied construction relatively simple. After the flushing water is discharged from the drinking cup holder, the stirring element is preferably dried by again rotating the stirring element in the then relatively dry environment in the drinking cup holder, whereby flushing water adhering to the stirring element will be substantially removed from the stirring element as a result of centrifugal forces.

The drink supply container will generally have a limited volume as this is advantageous from the viewpoint of logistics and hygiene. In order to enable the capacity of the device to be increased, it is advantageous if the flushing water supply is connected to the supply conduit via a first multi-way coupling which coupling is adapted for simultaneous coupling to a plurality of drink supply containers. By simultaneously incorporating a plurality of drink supply containers in the device, the capacity of the device can be considerably increased. By means of the multi-way coupling, the supply containers can be coupled successively to the supply conduit, whereby the supply containers can be emptied one after another. Opening and closing the respective drink supply containers can thus also be regulated using the multi-way coupling. In order to enable facilitated coupling of the drink supply containers to the multi-way coupling, the first multi-way coupling preferably comprises a plurality of respective coupling conduits. The first multi-way coupling preferably also comprises a plurality of respective closing valves to enable selective closure of the coupling conduits, and thereby of the supply containers, relative to the supply conduit. Each closing valve more preferably comprises sealing means to enable substantially liquid-tight closure of the coupling conduit relative to the supply conduit. The sealing means are preferably manufactured from an elastomer. In order to enable optimized closure of the coupling conduits, it is advantageous when the first multi-way coupling comprises biasing means for urging the closing valves to a position closing the coupling conduits relative to the supply conduit. In this way, leakages from the supply container(s) to the supply conduit can, on the one hand, be prevented while leakages from the supply conduit to the supply container(s) can also be prevented. Preventing leakages from the supply conduit to the supply containers is particularly relevant in the case where flushing water is being carried through the supply conduit, wherein it is undesirable for flushing water to enter one or more coupling conduits closed by the one or more closing elements, which could result in a contamination of the coupling conduits and of the supply container(s), and thereby of the device.

In yet another exemplary embodiment, the first multi-way coupling comprises an axially rotatable camshaft having a plurality of cams wherein each cam is adapted to operate at least one closing valve. With a differing relative orientation of the cams, the closing elements can be operated successively through rotation of the camshaft, whereby the coupling conduits can be successively closed or opened relative to the supply conduit. In this way, the different supply containers can be emptied successively (in line). This has the additional advantage that the coupling conduits connected to the already emptied supply containers can be opened (also in line) during the cleaning process and then be cleaned using the flushing water without the risk that the other coupling conduits connecting to the not yet fully emptied supply containers are cleaned. Operation of the camshaft preferably takes place by applying at least one motor. The multi-way coupling will generally be provided with one or more position sensors for recording the orientation of the cams connected to the camshaft, and thereby the orientation of the closing elements, relative to the coupling conduits. An accurate control of the multi-way coupling can be realized by coupling the motor and the at least one position sensor to a control unit. One exemplary embodiment of the first multi-way coupling has a modular construction wherein each module comprises at least one coupling conduit and at least one closing valve co-acting with the coupling conduit. In this way, the number of coupling conduits can be adapted in a relatively simple manner to the situational conditions, which imparts a high degree of flexibility to the multi-way coupling.

Although the supply of drink or flushing water to the dosing element could take place on the basis of gravitation, it is generally recommended that the supply conduit is provided with at least one pump for pumping drink or flushing water to the dosing element. By means of a pump, the drink or the flushing water can be fed to the dosing element in a dosed manner and at a constant flow rate, which enhances the eventual dosing of the drink. It is possible in this manner to ensure that the drink or the flushing water is forcibly displaced, whereby disruption of the liquid transport in the device, for instance, as a result of possible gas bubbles in the device, can be prevented. In one exemplary embodiment, the supply conduit is provided with at least one flow meter. The quantity of drink or flushing water displaced through the supply conduit can be recorded relatively accurately per unit time by means of the flow meter. This facilitates the dosing of the drink in the drinking cup, on the one hand, while on the other it is possible to determine relatively easily how much flushing water is situated in the drinking cup holder, assuming that the average discharge speed of the flushing water from the drinking cup holder is known. It is also possible to envisage the discharge conduit also being provided with at least one flow meter to enable the flushing water level in the drinking cup holder to be determined relatively precisely. The flow meter is preferably coupled to the pump via a control unit in order to enable regulation of the flow rate of the drink or the flushing water. It is also possible to envisage the pump being provided with a flow meter, whereby the flow meter can form an integral part of the pump.

In one exemplary embodiment, the flushing water supply is connected to the at least one supply conduit via at least one flushing conduit. The flushing water supply can be formed by the water mains water supply. The flushing water supply will, however, generally comprise at least one supply container, in particular, a boiler, to enable a quantity of flushing water to be held in supply and preferably also heated. It will be apparent that the supply container can be connected to the mains water supply in order to enable continuous or discontinuous replenishing of the supply container. The use of a separate flushing conduit generally facilitates the connection of the flushing water supply to the supply conduit and particularly, if applied, to the first multi-way coupling connected to the supply conduit. Through use of the flushing conduit it is moreover relatively easily possible to enrich the flushing water with one or more additives, in particular, a cleaning agent. For this purpose, the device comprises at least one cleaning agent supply container connected to the flushing conduit. The applied cleaning agent can be of very diverse nature and can, for instance, be formed by caustic soda or potassium (per)chlorate. In one exemplary embodiment, the at least one discharge conduit is coupled to the flushing conduit. In this way, a flushing water circuit is created in the device according to the present disclosure to enable recirculation of flushing water, this generally being particularly advantageous from an economic, ecological and practical viewpoint.

In another exemplary embodiment, the supply conduit is provided with at least one conductivity sensor. The ion concentration in the liquid present in the supply conduit can be determined by measuring the electrical conductivity in the supply conduit, whereby the presence of cleaning agent, generally formed by one or more soluble salts, in the supply conduit can be established. It will be apparent that as much as possible, and preferably all, of the cleaning agent must be removed from the supply conduit before a dosed quantity of drink can be dispensed by the device.

The discharge conduit is preferably coupled to a waste container to enable eventual definitive removal of the contaminated flushing water from the supply conduit, the discharge conduit and, if applied, the flushing conduit. The waste container can be formed by a collecting vessel, although it can also be formed by the sewage system. In order to enable regulation of the flow of the flushing water present in the discharge conduit, it is advantageous that the device comprises a second multi-way coupling for selective mutual coupling of the discharge conduit, the supply container for cleaning agent, the waste container and the flushing conduit. In this way it is possible to determine whether the flushing water coming from the discharge conduit must be recirculated or whether this flushing water must be discharged. In the case where the flushing water coming from the discharge conduit must be recirculated, it is also possible using the second multi-way coupling to determine whether or not the flushing water for recirculating must be enriched with additives, in particular, cleaning agent.

In yet another exemplary embodiment, the dosing element is coupled to at least one additive supply container for enriching a quantity of drink dosed by the dosing element with a dosed quantity of additive. Enriching the drink with the additive could, for instance, take place in the dosing element. It is also possible to envisage the additive only being added to the drink in the drinking cup. Examples of possible additives include, but are not limited to, coloring agents, flavorings, aromatic substances, thickeners, preservatives and the like.

In addition, it is possible to envisage having a cooled drink prepared by the device according to the present disclosure by applying at least one cooling medium supply container coupled to the dosing element for the purpose of cooling a quantity of drink dosed by the dosing element using a dosed quantity of cooling medium. The cooling medium is preferably formed here by a cryogenic cooling medium, in particular, liquid nitrogen, to enable quick and effective cooling of the dosed quantity of drink, wherein the quantity of cooling medium to be used will be limited. Further details relating to the cooling of drinks by means of a cryogenic cooling medium are described in International Patent Application No. PCT/NL2008/050068.

The present disclosure also relates to a multi-way coupling for use in the device. Structural details and the advantageous operation of the multi-way coupling have already been described at length hereinabove.

In addition, the present disclosure relates to a method for cleaning a device comprising, in one exemplary embodiment, the steps of (a) flushing the supply conduit with flushing water from the flushing water supply, (b) collecting flushing water flushed through the supply conduit in the drinking cup holder, and (c) discharging collected flushing water from the drinking cup holder. By applying the method according to the present disclosure, the supply conduit, the dosing element and the drinking cup holder can be cleaned in a relatively simple and efficient manner, which enhancing the cleanliness and thereby the hygiene of the device. In the case wherein a first multi-way coupling is applied, the one or more coupling conduits connected to already emptied drink supply containers can also be opened during the cleaning process, whereby these coupling conduits can also be cleaned.

The method preferably also comprises a step (d), closing the drinking cup holder before having the drinking cup holder collect flushing water. Splashing of flushing water and/or other substances from the drinking cup holder, and thereby contamination of the device, can be prevented by closing the drinking cup holder. Closing of the drinking cup, moreover, makes it possible for the method to also comprise a step (e), actively setting into motion flushing water situated in the drinking cup holder after closing of the drinking cup holder according to step (d). Actively setting into motion the flushing water situated in the drinking cup holder preferably takes place by applying a stirring element. It is, however, also possible to envisage gas bubbles, in particular, air bubbles, being blown into the flushing water situated in the drinking cup holder. Actively setting the flushing water into motion generally increases the effectiveness of the cleaning process in a substantial manner. From the viewpoint of effectiveness of the cleaning process, it is also recommended that the method comprises step (f), heating the flushing water before flushing of the supply conduit according to step (a). The ideal temperature of flushing water depends on the nature of the device and, in particular, the nature of the drink used. In the case where the drink to be prepared comprises, for instance, proteins, such as in the preparation of milkshakes, it is then recommended that the flushing water is, in the first application, no warmer than 40 degrees Celsius in order to prevent solidification (precipitation) of proteins in the device. After flushing out the proteins, warmer flushing water with a temperature above 40 degrees Celsius can optionally be applied to optimize the final cleaning and possible disinfection of the device.

In yet another exemplary embodiment, the method also comprises a step (g), adding cleaning agent to the flushing water before flushing the supply conduit according to step (a). The cleaning agent can have a disinfecting action on the device and thereby enhance the intensity of the cleaning process.

The method according to the present disclosure preferably also comprises a step (h), after discharging collected flushing water from the drinking cup holder according to step (c), flushing the supply conduit again with at least a part of the collected flushing water.

In this method at least a part of the already used (contaminated) flushing water will be recirculated, which will generally be advantageous from an economic, ecological and practical viewpoint.

The method preferably also comprises a step (i), measuring the conductivity of flushing water flowing through the supply conduit during flushing of the supply conduit with flushing water according to step (c). The possible presence of cleaning agent can be detected by measuring the conductivity in the supply conduit. The cleaning agent situated in the supply conduit will then be flushed with clean flushing water in order to ready the device for operation in preparing a drink.

The method preferably also comprises a step (j), after discharging collected flushing water from the drinking cup holder as according to step (c), collecting the flushing water in a waste container. The used (contaminated) flushing water will finally be collected in the waste container, which is generally formed by a waste vessel and/or a sewer system.

In another exemplary embodiment of the method according to the present disclosure, the method further comprises the steps of: step (k) heating flushing water to a temperature of a maximum of 40 degrees Celsius according to step (f); step (l) flushing the supply conduit with the heated flushing water according to step (a); step (m) collecting in the drinking cup holder flushing water flushed through the supply conduit as according to step (b); step (n) discharging collected flushing water from the drinking cup holder according to step (c); step (o) collecting flushing water discharged from the drinking cup holder in a waste container according to step (j); step (p) heating flushing water to a temperature of between 50 and 100 degrees Celsius as according to step (f); step (q) enriching the heated flushing water with at least one cleaning agent according to step (g); step (r) flushing the supply conduit with the heated flushing water according to step (a); step (s) collecting in the drinking cup holder flushing water flushed through the supply conduit according to step (b); step (t) discharging collected flushing water from the drinking cup holder according to step (c); step (u) again guiding at least a part of the collected flushing water through the supply conduit and the drinking cup holder according to step (h); step (v) collecting in a waste container flushing water discharged from the drinking cup holder according to step (j); step (w) flushing the supply conduit with flushing water according to step (a); and step (x) measuring the electrical conductivity of the flushing water in the supply conduit according to step (i). In this exemplary embodiment, three phases can be distinguished: pre-flushing with lukewarm flushing water formed by steps (k)-(o); intensive cleaning with warm flushing water formed by steps (p)-(v), and further flushing formed by step (w). Measuring the conductivity in the supply conduit according to step (x) will take place during the further flushing. It is, however, also possible to envisage the measuring of the conductivity according to step (x) being applied in all the phases stated hereinabove.

BRIEF DESCRIPTION OF THE DRAWINGS

Various aspects of the present disclosure are described hereinbelow with reference to the accompanying figures.

DETAILED DESCRIPTION

Figure 1:
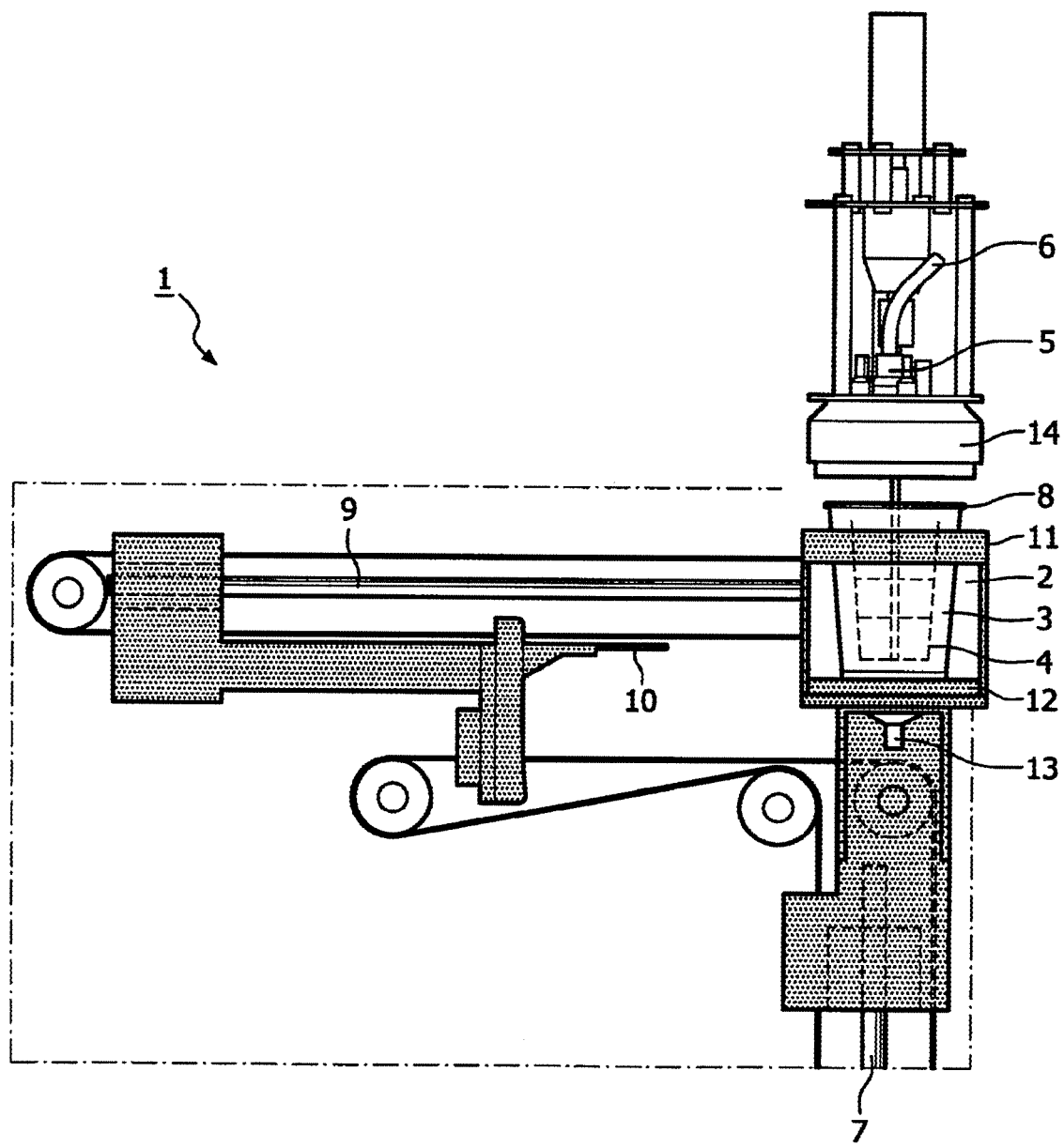
FIG. 1 shows a detailed front view of a part of one exemplary embodiment of a device for preparing drinks.

FIG. 1 shows a detailed front view of a part of one exemplary embodiment of a device 1 according to the present disclosure. Device 1 comprises a thermally insulating cup holder 2. The cup holder 2 is adapted to releasably receive a disposable or more durable drinking cup 3. Device 1 also comprises a stirring element 4 which, in the shown situation, is positioned partially in drinking cup 3. Device 1 further comprises a dosing element 5. The dosing element 5 is coupled to a supply conduit 6 for drink and to supply conduits (not shown) for cooling medium and additive, respectively. The dosing element is adapted for time-controlled dosage of a quantity of drink, cooling medium and additive to drinking cup 3. Further details relating to the addition of the components to drinking cup 3 are described in International Patent Application No. PCT/NL2008/050068. In this exemplary embodiment, cup holder 2, and thereby drinking cup 3, are vertically displaceable along a first guide 7 relative to stirring element 4 and dosing element 5. After preparation of the cooled drink, the cup holder 2, and thereby drinking cup 3, will be displaced in a downward direction away from stirring element 4 to an intermediate position in which an upper edge 8 of drinking cup 3 is situated just lower than stirring element 4. Device 1 also comprises a manipulating element 10 horizontally displaceable along a second guide 9. Manipulating element 10 is adapted as a so-called pick & place element and is adapted to engage round drinking cup 3 in the intermediate position such that upper edge 8 of drinking cup 3 will generally rest on manipulating element 10. Drinking cup 3 will be held in this position while cup holder 2 will be displaced further in a downward direction to a lowermost position in which an upper edge 11 of cup holder 2 is situated just below a lower edge 12 of drinking cup 3. Manipulating element 10 will then generally displace drinking cup 3 in a linear (horizontal) movement to a dispensing opening (not shown) where drinking cup 3, provided with freshly cooled drink, can be taken out of device 1 and can be consumed. As shown, cup holder 2 will be positioned directly below stirring element 4 after removal of drinking cup 3, whereby cup holder 2 is adapted to collect drink residues dripping from stirring element 4. Cup holder 2 is, therefore, provided with a discharge 13 which will be connected to a discharge conduit (not shown) to enable discharge of collected drink residues. If after the preparation of a cooled drink the stirring element 4 and cup holder 2 were to be flushed clean with flushing water optionally provided with a cleaning agent, administered via supply conduit 6 for drink, this flushing water could also be collected by and discharged via cup holder 2. Prior to cleaning, cup holder 2 is displaced in an upward direction until stirring element 4 is accommodated substantially wholly in cup holder 2. Cup holder 2 is closed by a closing element 14 connected to stirring element 4 and the at least one dosing element 5 in order to be able to minimize splashing of drink residues and cleaning agent outside cup holder 2, and thereby minimize contamination of device 1. An underside of closing element 14, adapted to engage on cup holder 2, is preferably manufactured from and/or provided with a sealing element in order to realize a substantially medium-tight, in particular, substantially liquid-tight, closure of cup holder 2. During the cleaning of stirring element 4 it is generally advantageous to rotate stirring element 4, whereby drink residues and cleaning agent will be removed relatively easily from the stirring element and whereby a more intensive cleaning of cup holder 4 is possible.

Figure 2:
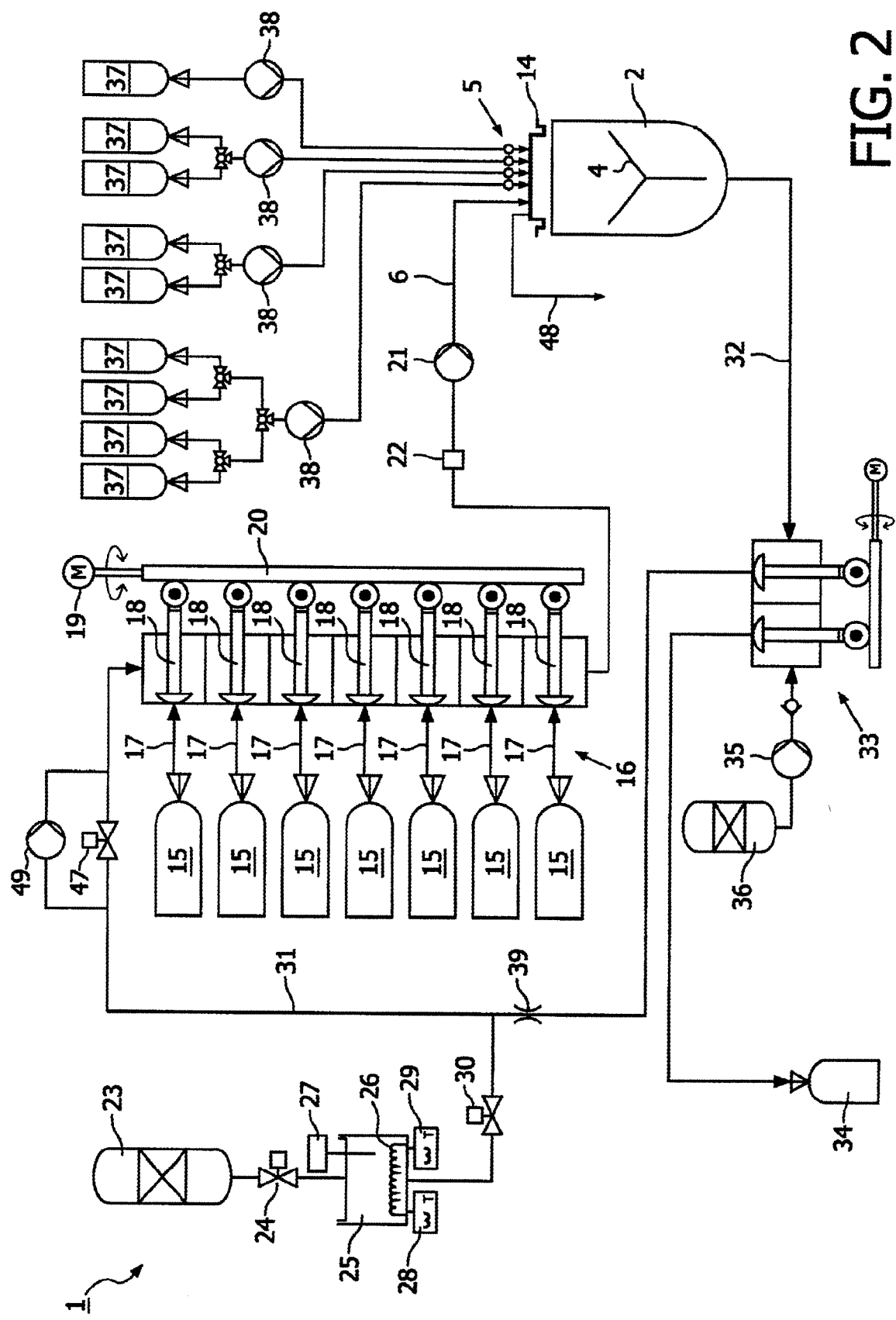
FIG. 2 is a process diagram showing the operation and, in particular, the cleaning of the device shown in FIG. 1.
Figure 3:
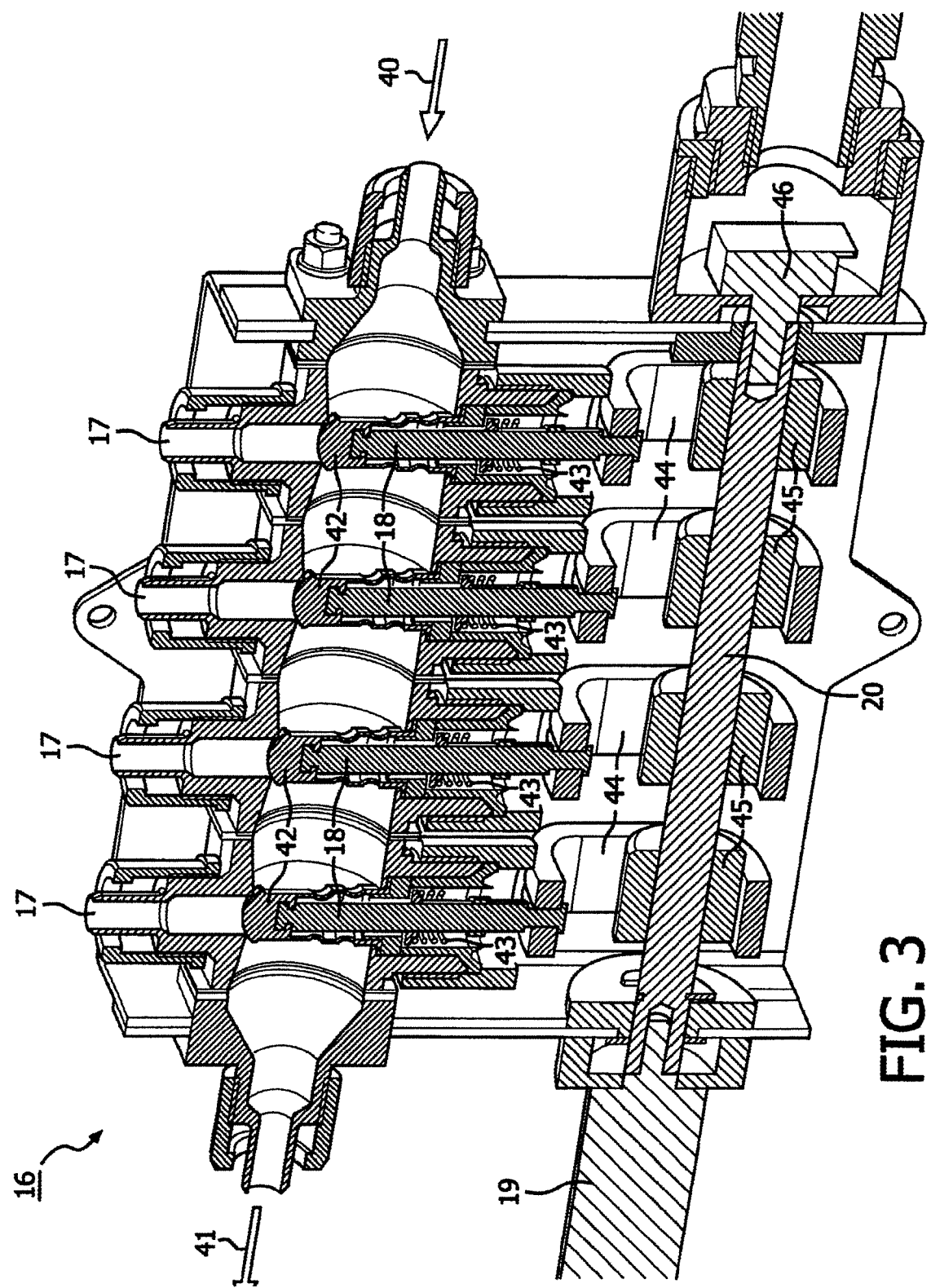
FIG. 3 shows a cross-section of the first multi-way coupling as used in the device shown in FIGS. 1 and 2.

FIG. 2 is a process diagram which shows the operation and, in particular, the cleaning of device 1 according to the exemplary embodiment discussed hereinabove with respect to FIG. 1. The components shown in FIG. 2 all form an integral part of device 1, although the components are only shown schematically in this figure. In this exemplary embodiment, device 1 comprises seven drink supply containers 15, wherein each drink supply container 15 is preferably formed by a so-called bag-in-box, which containers are coupled via a first multi-way coupling 16 to supply conduit 6 for supplying drink to the dosing element 5 connected to closing element 14. The first multi-way coupling 16 comprises a plurality of coupling conduits 17 for coupling drink supply containers 15 to supply conduit 6. Coupling conduits 17 can be closed and opened individually by applying a corresponding number of closing elements 18. In this way, drink supply containers 15 can be emptied one by one. Closing elements 18 can be operated via a camshaft 20 driven by an electric motor 19. A structural detail view of the first multi-way coupling 16 is shown in FIG. 3. Supply conduit 6 for drink is provided with a pump 21 for displacing drink to dosing element 5. Supply conduit 6 is also provided with a conductivity sensor 22 for measuring the electrical conductivity of liquid present in supply conduit 6. In this exemplary embodiment, device 1 comprises a flushing water supply 23 which is connected to a boiler 25 via a closing valve 24. Boiler 25 is adapted to heat flushing water present in boiler 25 to a predefined temperature. Boiler 25 is provided for this purpose with a heating element 26, a flushing water level sensor 27 and a first thermal switch 28 adapted to switch off boiler 27 when the flushing water has reached a temperature of 40 degrees Celsius, and a second thermal switch 29 adapted to switch off boiler 27 when the flushing water has reached a temperature of 90 degrees Celsius. Device 1 comprises a closing valve 30 for closing off boiler 27 from a flushing conduit 31. Flushing conduit 31 is connected to supply conduit 6 via a safety valve 47 and the first multi-way coupling 16, whereby the first multi-way coupling 16 and supply conduit 6 can be flushed and, in this way, be cleaned with flushing water. The flushing water is collected in cup holder 2 after which the flushing water is discharged via a discharge conduit 32 connected to cup holder 2. Discharge conduit 32 is connected to the flushing conduit via a second multi-way coupling 33. The second multi-way coupling 33 is also coupled to a waste container 34. In addition, the second multi-way coupling 33 is coupled via a pump 35 to a cleaning agent supply container 36. Apart from the number of couplings, the second multi-way coupling 33 is structurally identical to the first multi-way coupling 16. The flushing water discharged via discharge conduit 32 can be at least partly fed back to flushing conduit 31 by means of the second multi-way coupling 33, wherein the flushing water for recirculation can also be enriched with cleaning agent. By means of the second multi-way coupling 33, it is also possible to collect the flushing water discharged via discharge conduit 32 in waste container 34. Conductivity sensor 22 can detect the presence and the concentration of cleaning agent in supply conduit 6, thereby minimizing the risk of health hazards. Flushing conduit 31 comprises a flow restriction for the purpose of forcing a correct flow direction in flushing conduit 39 (in the direction of supply conduit 6). Device 1 further comprises different additive supply containers 37 for being able to provide the drink with a total of four different flavors. The desired additive can be pumped by means of a pump to dosing element 5, where the dosing of the additive will take place. Since the additives generally consist of sugary liquid substances which have a relatively long shelf life, and wherein the likelihood of deterioration is minimal, the components required for the addition of additive to the drink, except for dosing element 5, do not form part of the cleaning circuit in device 1 according to the present disclosure. By integrating a cleaning circuit into device 1 according to the present disclosure, device 1 can be cleaned relatively quickly, effectively and inexpensively, enhancing the reliability and the durability of device 1. During the cleaning, closing element 14 is connected to cup holder 2 in preferably a substantially liquid-tight manner, whereby supply conduit 4, opened coupling conduits 17, dosing element 5 (or at least a part thereof), cup holder 2 and stirring element 4 can be cleaned intensively. If the device 1 as shown were adapted for the preparation of milkshakes, it could be an option in the cleaning of device 1 to first pre-flush device 1 for several minutes (generally a maximum of 4 minutes) with lukewarm (clean) flushing water at a temperature of 40 degrees Celsius, after which the flushing water will be collected in waste container 34. The second multi-way coupling 33 is preferably closed here, whereby the flushing water level in cup holder 2 will rise until cup holder 2 is substantially completely filled with flushing water. In this way, both cup holder 2 and closing element 14 can be cleaned in a relatively intensive and substantially complete manner. In order to enable discharge of excess flushing water in this situation, closing element 14 is preferably provided with an overflow 48. Overflow 48 can take a closable form and/or be provided with a non-return valve to prevent entry of liquid or gas into cup holder 2 via overflow 48. The discharged flushing water will generally be removed from device 1 via overflow 48. After the cleaning of cup holder 2 and closing element 14, the second multi-way coupling 33 will be opened, after which discharge of flushing water will take place via discharge conduit 32. Relatively warm flushing water with a temperature of about 90 degrees Celsius and enriched with cleaning agent will then be circulated through the cleaning circuit for several minutes (generally 6 to 7 minutes), after which the contaminated flushing water is collected in waste container 34. After the flushing water has run out of the relevant conduits, device 1 will be flushed further with clean and relatively cold cooling water until conductivity sensor 22 detects that all the cleaning agent has been flushed out of supply conduit 6 and that cleaning agent is thus no longer present in supply conduit 6. As shown in FIG. 2, flushing conduit 31 is provided with a cleaning pump 49. The cleaning pump 49 is connected in parallel with safety valve 47. Cleaning pump 49 is applied to enable selective cleaning of the coupling conduits 17 connected to drink supply containers 15. In general, however, cleaning of a coupling conduit 17 takes place only after substantially complete emptying of a drink supply container 15 connected to this coupling conduit 17 in order to prevent contamination of the drink (for consumption) received in drink supply container 15. If a drink supply container 15 has been substantially or wholly emptied, pump 21 will be switched off and cleaning pump 49 will be switched on. Safety valve 47 will be closed temporarily. Because pump 21 is switched off, supply conduit 6 will, in fact, be interrupted as a result of which a pressure will build up between the switched-on cleaning pump 49 and the switched-off pump 21. By then operating camshaft 20 by means of electric motor 19 such that the coupling conduit 17 connecting to the emptied drink supply container 15 is opened, the relevant coupling conduit 17 can be flushed with flushing water and in this way cleaned. It will be possible to complete the process of cleaning coupling conduits 17 relatively quickly wherein, in this exemplary embodiment, cleaning pump 49 is activated three times for ten seconds for selective cleaning of coupling conduits 17. This relatively short-lasting cleaning process is generally, although not necessarily, performed after the other components of device 1, as specified above, have been cleaned. Cleaning pump 49 will be switched off, safety valve 47 will be open and pump 21 switched on during cleaning of these other components of device 1. After cleaning of device 1, device 1 is once again ready for use in preparing drinks. In this operational state of device 1, the cleaning pump 49 will be switched off and safety valve 47 and the second multi-way coupling 33 will be closed. Safety valve 47 forms an additional safety provision in the case where the second multi-way coupling 33 no longer closes the cleaning agent supply container 36 completely, whereby it is possible in an improved manner to prevent cleaning agent being left during operation in the first multi-way coupling 16, in supply conduit 6 and, therefore, ultimately in the drink for consumption.

FIG. 3 shows a cross-section of first multi-way coupling 16 as used in device 1 according to FIGS. 1 and 2, wherein it is noted that, for the sake of clarity, the multi-way coupling 16 shown in FIG. 3 is adapted to couple six conduits, while the actually applied multi-way coupling 16 is adapted to couple nine conduits, which does not otherwise alter the operating principle of multi-way coupling 16. Multi-way coupling 16 comprises an inlet 40 for flushing water and an outlet 41 for respectively flushing water and drink. As shown, all four coupling conduits 17 are closed by closing elements 18 in the shown configuration. In order to be able to optimize this closure, each closing element 18 is provided with a top element 42 manufactured from an elastomer. Each closing element 18 is pressed in the direction of the closing position by applying a spring 43. Each closing element 18 is coupled to a pulling frame 44, this pulling frame 44 being adapted to co-act with a cam 45 mounted on camshaft 20. Cam 45 is connected eccentrically to camshaft 20, wherein the mutual orientation of cams 45 relative to camshaft 20 differs, whereby coupling conduits 17 can be opened successively. As already stated, camshaft 20 is driven by an electric motor 19. A position sensor 46 records the current position of camshaft 20, and thereby the orientation of closing elements 18 relative to coupling conduits 17. In this way, it is possible to record which drink supply containers 15 have or have not already been emptied. Detection of the empty state of a drink supply container 15 generally takes place using a flow meter (not shown) incorporated in supply conduit 6. Multi-way coupling 16 has a modular construction, with four modules in the example shown in FIG. 3, wherein each module comprises a pulling frame 44, a cam 45, a closing element 18 and a coupling conduit 17. In this way, the number of couplings of multi-way coupling 16 can be adapted in a relatively simple manner enhancing the flexibility of multi-way coupling 16.

It will be apparent that the invention is not limited to the exemplary embodiments shown and described here, but that numerous variants, which will be self-evident to the skilled person in this field, are possible within the scope of the appended claims. It should further be noted that any patents, applications and publications referred to herein are incorporated by reference in their entirety.

The invention claimed is:

1. A device for preparing drinks, comprising:
   (a) at least one drink supply container;
   (b) at least one dosing element connected to the drink supply container by at least one supply conduit for dosing a quantity of drink;
   (c) at least one drinking cup holder adapted to releasably hold at least one drinking cup to enable collection of a dosed quantity of drink dispensed by the dosing element, wherein the drinking cup holder has at least one discharge;
   (d) at least one discharge conduit connected to the discharge of the drinking cup holder;
   (e) at least one flushing water supply connected to the supply conduit and closable relative to the supply conduit for flushing the supply conduit;
   (f) a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element; and
   (g) at least one stirring element adapted to be positioned at least partially in a space enclosed by the drinking cup holder.

2. A device for preparing drinks, comprising:
   (a) at least one drink supply container;
   (b) at least one dosing element connected to the drink supply container by at least one supply conduit for dosing a quantity of drink;
   (c) at least one drinking cup holder adapted to releasably hold at least one drinking cup to enable collection of a dosed quantity of drink dispensed by the dosing element, wherein the drinking cup holder has at least one discharge;
   (d) at least one discharge conduit connected to the discharge of the drinking cup holder;
   (e) at least one flushing water supply connected to the supply conduit and closable relative to the supply conduit for flushing the supply conduit;
   (f) at least one stirring element adapted to be positioned at least partially in a space enclosed by the drinking cup holder; and,
   (g) a closing element for substantially liquid-tight closing of the drinking cup holder, wherein the dosing element is connected to said closing element, wherein the orientation of the drinking cup holder relative to the closing element can be changed between an opened configuration positioned at a distance from the closing element and a closed configuration connecting to the closing element, and wherein the closing element is adapted to enclose at least a part of the stirring element.

3. A device for preparing drinks, comprising:
   (a) at least one drink supply container;
   (b) at least one dosing element connected to the drink supply container by at least one supply conduit for dosing a quantity of drink;
   (c) at least one drinking cup holder adapted to releasably hold at least one drinking cup to enable collection of a dosed quantity of drink dispensed by the dosing element, wherein the drinking cup holder has at least one discharge;
   (d) at least one discharge conduit connected to the discharge of the drinking cup holder;
   (e) at least one flushing water supply connected to the supply conduit and closable relative to the supply conduit for flushing the supply conduit;
   (f) a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element; and
   (g) a first multi-way coupling adapted to connect the flushing water supply to the supply conduit, wherein the first multi-way coupling is adapted for simultaneous coupling to a plurality of drink supply containers.

4. The device of claim 3, wherein the first multi-way coupling comprises a plurality of coupling conduits for coupling the drink supply containers to the first multi-way coupling.

5. The device of claim 3, wherein the first multi-way coupling comprises a plurality of closing valves to enable selective closure of the coupling conduits relative to the supply conduit.

6. The device of claim 5, wherein each closing valve comprises sealing means to enable substantially liquid-tight closure of the coupling conduit relative to the supply conduit.

7. The device of claim 5, wherein the first multi-way coupling further comprises biasing means for urging the closing valves to a position closing the coupling conduits relative to the supply conduit.

8. The device of claim 5, wherein the first multi-way coupling further comprises an axially rotatable camshaft having a plurality of cams, wherein each cam is adapted to operate at least one closing valve.

9. The device of claim 8, wherein the device further comprises at least one motor for driving the camshaft.

10. The device of claim 5, wherein the first multi-way coupling has a modular construction, wherein each module comprises at least one coupling conduit and at least one closing valve co-acting with the coupling conduit.

11. A device for preparing drinks, comprising:
    (a) at least one drink supply container;
    (b) at least one dosing element connected to the drink supply container by at least one supply conduit for dosing a quantity of drink;
    (c) at least one drinking cup holder adapted to releasably hold at least one drinking cup to enable collection of a dosed quantity of drink dispensed by the dosing element, wherein the drinking cup holder has at least one discharge;
    (d) at least one discharge conduit connected to the discharge of the drinking cup holder;
    (e) at least one flushing water supply connected to the supply conduit and closable relative to the supply conduit for flushing the supply conduit;
    (f) a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element;

(g) at least one flushing conduit adapted to connect the flushing water supply to the at least one supply conduit and wherein the at least one discharge conduit is coupled to the flushing conduit.

12. The device of claim 11, wherein the device further comprises at least one cleaning agent supply container connected to the flushing conduit for the purpose of enriching the flushing water situated in the flushing conduit with cleaning agent.

13. A device for preparing drinks, comprising:
(a) at least one drink supply container;
(b) at least one dosing element connected to the drink supply container by at least one supply conduit for dosing a quantity of drink;
(c) at least one drinking cup holder adapted to releasably hold at least one drinking cup to enable collection of a dosed quantity of drink dispensed by the dosing element, wherein the drinking cup holder has at least one discharge;
(d) at least one discharge conduit connected to the discharge of the drinking cup holder;
(e) at least one flushing water supply connected to the supply conduit and closable relative to the supply conduit for flushing the supply conduit;
(f) a closing element for substantially liquid-tight closing of the drinking cup holder, wherein the dosing element is connected to said closing element, and wherein the orientation of the drinking cup holder relative to the closing element can be changed between an opened configuration positioned at a distance from the closing element, and a closed configuration connecting to the closing element;
(g) at least one flushing conduit adapted to connect the flushing water supply to the at least one supply conduit; and
(h) a multi-way mutual coupling for selective mutual coupling of the discharge conduit, the supply container for cleaning agent, the waste container and the flushing conduit.

* * * * *